US010155464B2

(12) United States Patent
Boks et al.

(10) Patent No.: US 10,155,464 B2
(45) Date of Patent: Dec. 18, 2018

(54) HEAD RESTRAINT ASSEMBLIES

(71) Applicant: Gill Industries, Inc., Grand Rapids, MI (US)

(72) Inventors: Michael J. Boks, Grand Rapids, MI (US); John Witte, Ada, MI (US); Robert Sutter, Rockford, MI (US)

(73) Assignee: Gill Industries, Inc., Grand Rapids, MI (US)

( * ) Notice: Subject to any disclaimer, the term of this patent is extended or adjusted under 35 U.S.C. 154(b) by 275 days.

(21) Appl. No.: 15/085,110

(22) Filed: Mar. 30, 2016

(65) Prior Publication Data

US 2016/0288677 A1 Oct. 6, 2016

Related U.S. Application Data

(60) Provisional application No. 62/141,542, filed on Apr. 1, 2015.

(51) Int. Cl.
*B60N 2/20* (2006.01)
*B60N 2/841* (2018.01)
*B60N 2/68* (2006.01)
*B60N 2/844* (2018.01)
*B60N 2/859* (2018.01)

(52) U.S. Cl.
CPC ............. *B60N 2/841* (2018.02); *B60N 2/20* (2013.01); *B60N 2/682* (2013.01); *B60N 2/844* (2018.02); *B60N 2/859* (2018.02)

(58) Field of Classification Search
CPC ........ B60N 2/841; B60N 2/844; B60N 2/859; B60N 2/20; B60N 2/682
USPC ................................... 297/391, 410
See application file for complete search history.

(56) References Cited

U.S. PATENT DOCUMENTS

2013/0320737 A1* 12/2013 Jeong ..................... B60N 2/856
297/391

* cited by examiner

*Primary Examiner* — Syed A Islam
(74) *Attorney, Agent, or Firm* — Dickinson Wright PLLC

(57) ABSTRACT

A head restraint assembly for a seat, the assembly including: At least one support for mounting a bun assembly above the seat back; a bun assembly including a core portion, the core portion having integral first bearing surfaces; a stationary hub mounted on the at least one support, the stationary hub disposed at least substantially within the core portion and pivotally supporting the core portion via the integral first bearing surfaces; and a lock pivotally supported within the core portion. The lock is selectively pivotally moveable between positions of engagement with, and disengagement from, the stationary hub. The position of engagement is characterized in that the core portion is fixed relative to the stationary hub and at least one support, and the position of disengagement is characterized in that the core portion is pivotally moveable relative to the stationary hub and at least one support.

31 Claims, 9 Drawing Sheets

HEAD RESTRAINT ASSEMBLIES

CROSS-REFERENCE TO RELATED APPLICATIONS

The present application is related to, and claims the benefit of priority from, U.S. Provisional Application Ser. No. 62/141,542, filed 1 Apr. 2015, the disclosure of which is incorporated herein by reference in its entirety.

FIELD OF THE INVENTION

The present invention relates to head restraint assemblies such as, for instance, are employed in vehicles, and, more particularly, to foldable head restraints.

BACKGROUND

Head restraint assemblies, which generally comprise a headrest component—commonly called a bun—adjustably supported on the top of a vehicle seat-back, protect a vehicle occupant from serious injury due to sudden acceleration or deceleration of the vehicle. In rear-seat applications, it is known for such head restraint assemblies to be selectively adjustable between an upright position, in which the head restraint assembly is generally vertically oriented relative to the seat back, and a folded position, in which the head restraint assembly is pivoted forwardly or rearwardly relative to the seat back and oriented approximately 90 degrees from the upright position. In the folded position, as is known, the seat is better configured for stowage (i.e., folding of the rear seat backs to convert the rear passenger area of the vehicle into a storage area). While many mechanisms are known for accomplishing pivotal movement of the head restraint assembly relative to the seat back, there is room for improvement.

SUMMARY

Disclosed herein is a head restraint assembly for a seat, the head restraint assembly comprising: At least one support for mounting a bun assembly above the seat back; a core portion having integral first bearing surfaces; a stationary hub mounted on the at least one support, the stationary hub disposed at least substantially within the core portion and pivotally supporting the core portion via the integral first bearing surfaces; and a lock pivotally supported within the core portion. The lock is selectively pivotally moveable between positions of engagement with, and disengagement from, the stationary hub, wherein the position of engagement is characterized in that the core portion is fixed relative to the stationary hub and at least one support, and the position of disengagement is characterized in that the core portion is pivotally moveable relative to the stationary hub and at least one support.

In one embodiment, each at least one support has a free upper end terminating in a curved end received in a corresponding opening in the hub.

In one embodiment, a pair of spaced-apart supports are provided, each support having a free upper end terminating in a curved end received in one or a pair of corresponding openings in the hub which are oriented generally perpendicular to a longitudinal axis of the hub. Interference ribs may also be disposed within each of the opening in the hub, each interference rib contacting the exterior surface of each support to create an interference fit between the supports and the hub.

Per one feature of the invention, each support is locked in position within the hub by means of a U-bracket engaging both the hub and the support.

In one embodiment, the core portion is comprised of mating halves. Each mating half may, according to one form of the invention, be monolithic. When mated, the mating halves define an internal area for housing the hub and lock.

Per another feature, interiorly-facing surfaces of each mating half comprise complimentary portions which collectively define the first bearing surfaces. In one form of the invention, each of the complimentary portions are semi-cylindrical in shape and include a semi-circular shaped shoulder extending radially inwardly, and wherein further, in the mated condition of the mating halves, the complimentary portions and shoulders collectively define a pair of cylindrical openings having a first internal diameter and inwardly-projecting annular shoulders defining openings of a second, smaller internal diameter.

According to a further feature, a pair of pivot portions are provided on the hub, each pivot portion taking the form of an annular flange extending radially from the hub. The hub is captured between the mating halves with the first bearing surfaces riding on the pivot portions to facilitate pivotal movement of the core portion relative to the hub.

Per another feature, each mating half includes complimentary portions of second bearing surfaces which, in the mated condition of the mating halves, define a pair of cylindrical openings for receiving pivot pins by which the lock is pivotally supported on the core portion proximate the hub.

According to still another feature, one of the mating halves includes a secondary lock support engaging with a hook provided on the stationary hub when the lock is in the position of engagement with the stationary hub.

Per another feature, the lock may be biased into the position of engagement with the stationary hub.

Per a still further feature, an adjustment mechanism may be provided to selectively pivotally move the lock into the position of disengagement from the stationary hub. The adjustment mechanism includes a slide member disposed within the hub, the slide member being reciprocally moveable between extended and retracted positions thereof. The slide member has a cam surface which, in the extended position of the slide member, acts against the lock to urge the lock into the position of disengagement from the stationary hub.

In one form of the invention, the slide member may be biased to the retracted position thereof.

In one embodiment, the adjustment mechanism includes a cable connected to the slide member, the slide member being moveable into the extended position thereof by movement of the cable. Alternatively, or in addition, the adjustment mechanism includes a user-operable actuator reciprocally, moveably positioned within the hub, the slide member being moveable into the extended position thereof by movement of the actuator.

Per another feature, the core portion is biased to automatic pivotal movement relative to the relative to the stationary hub and at least one support when the lock is in the position of disengagement from the stationary hub.

BRIEF DESCRIPTION OF THE DRAWINGS

The foregoing and other features and advantages of the present invention may be better understood with reference to the specification and accompanying drawings, of which.

DETAILED DESCRIPTION

Figure 1:
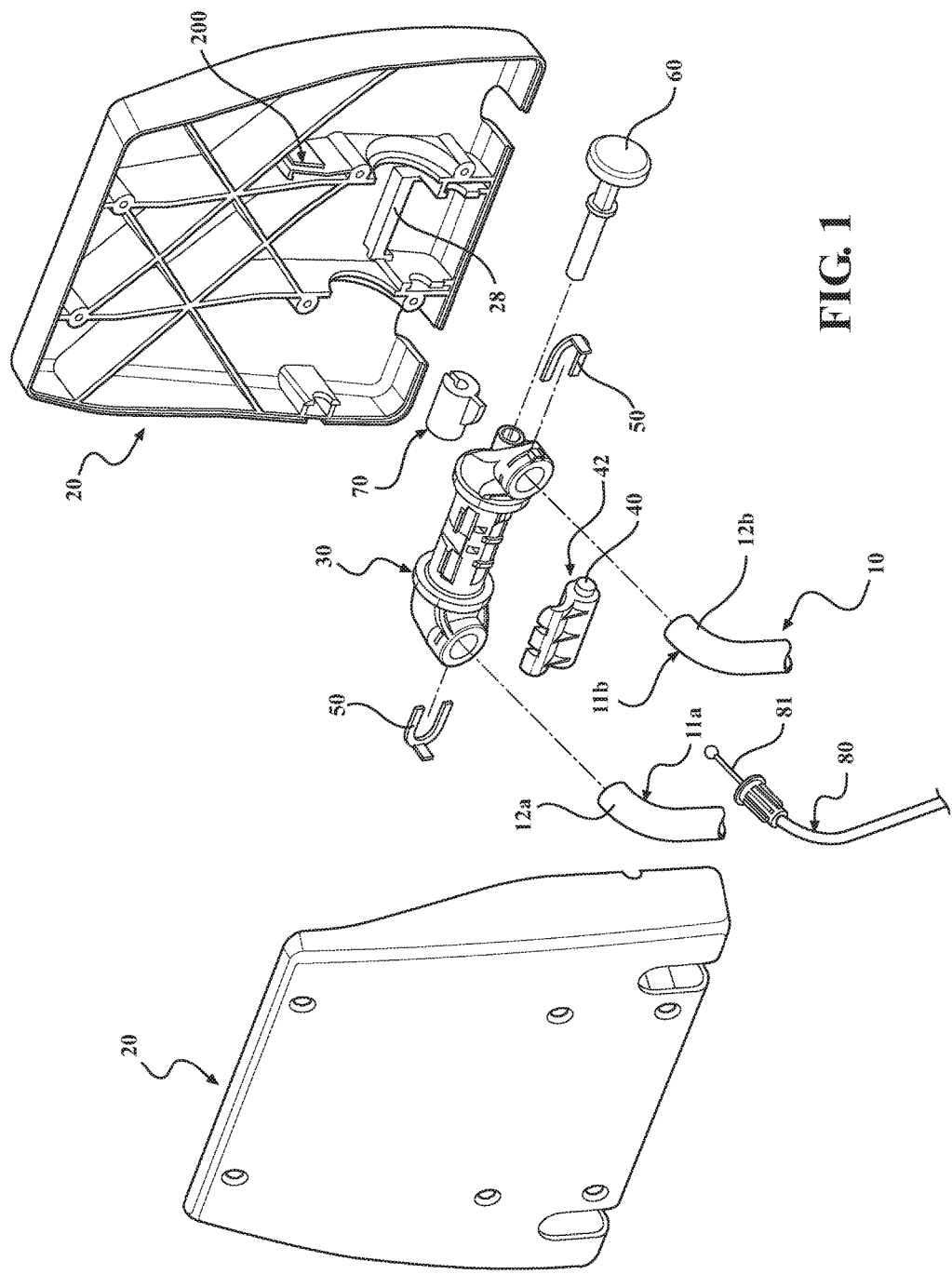
FIG. 1 is an exploded perspective view of the head restraint assembly according to the exemplary embodiment.

Referring to FIGS. 1 through 9, wherein like numerals indicate like or corresponding parts throughout the several views, the present invention is a head restraint assembly for a seat of the type including a seat back (neither the seat nor the seat back are depicted). According to the exemplary embodiment, the head restraint assembly includes at least one support (indicated generally at 10) for mounting a core portion 20 above the seat back. The core portion 20 forms the bulk of the bun assembly which, as will be appreciated by those skilled in the art, further comprises a cover (not depicted) of fabric or other material, which cover is disposed over the core portion 20 with a suitable padding material (e.g. foam) (not depicted) disposed in between.

A stationary hub 30 is mounted on the at least one support 10. Stationary hub 30 is disposed at least substantially within, and pivotally supports, the core portion. A lock 40 pivotally supported within the core portion 20 is selectively pivotally moveable between positions of engagement with, and disengagement from, the stationary hub 30. As described further below, the position of engagement is characterized in that position of the core portion 20 relative to the stationary hub 30 and at least one support 10 is fixed, while the position of disengagement is characterized in that the core portion 20 is pivotally moveable relative to the stationary hub 30 and the at least one support 10.

While the following exemplary embodiment of the invention is described in the specific operational environment of a head restraint assembly for a vehicle, such as an automobile, it will be appreciated that the present invention may be adapted to other seating systems as well.

The at least one support 10 may, as shown by way of example and not limitation, take the form of a pair of spaced-apart supports 11a, 11b, each of which is, per convention, substantially straight along its principal length so as to be able to support the core portion (and, therefore, the bun assembly) vertically above the seat back. The supports 11a, 11b may be made of metal, polymer, polymer-coated metal or other materials suitable to the purpose. Of course, the head restraint support 10 may be comprised of fewer or more supports, and of different configurations, than depicted in the exemplary embodiment.

In the illustrated embodiment, the free upper ends of the supports 11a, 11b each terminate in a curved end 12a, 12b, respectively, received in openings 31 in the hub 30 as hereafter described. Per convention, the free, lower ends (not shown) of the supports 11a, 11b are received in head restraint guides (not depicted) provided in the top of the seat back (not shown).

Figure 2:
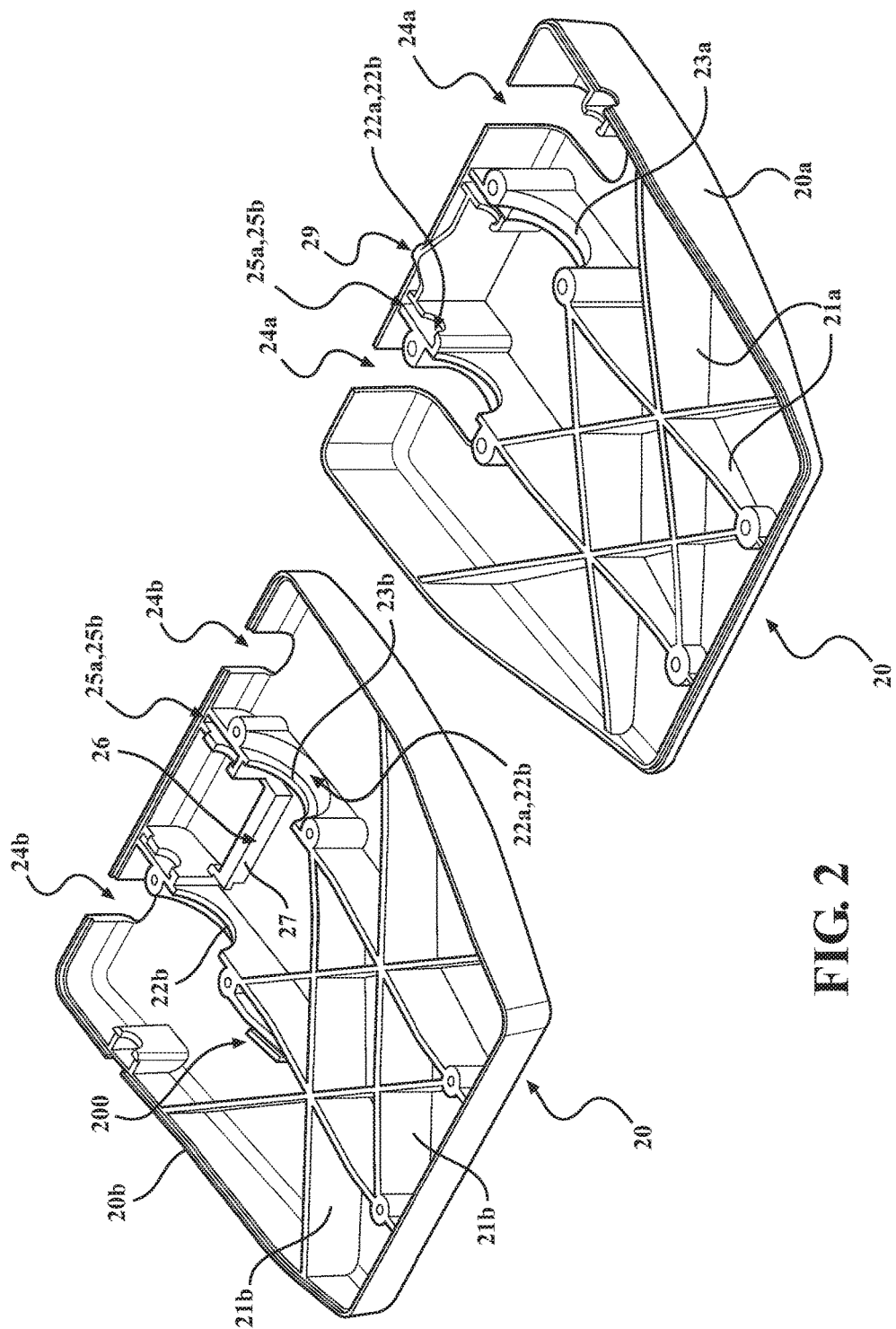
FIG. 2 shows, in perspective view, the separate mating halves of the core portion according to the exemplary embodiment.

Core portion 20 according to the exemplary embodiment is made up of mating halves 20a, 20b which may be secured together by any conventional means, including, by way of non-limiting example, fasteners, adhesives, etc. Core portion 20 may be made of plastic, metal or other suitable material. As best shown in FIGS. 1 and 2, each of mating halves 20a, 20b is, except as otherwise noted, substantially identical in construction and appearance. As will be appreciated from FIG. 2, the mating halves 20a, 20b define, when mated, an internal area for housing the hub 30, lock 40 and other components as described hereafter. On interiorly-facing surfaces (shown best in FIG. 2), each mating half 20a, 20b includes, respectively, structurally-reinforcing webs 21a, 21b, as well as complimentary portions of integral, first bearing surfaces 22a, 22b by which the core portion 20 is pivotally supported on the hub 30. As shown, each bearing surface 22a, 22b is semi-cylindrical in shape and includes, at one end, a semi-circular shaped flange or shoulder 23a, 23b extending radially inwardly. In the mated condition of the mating halves 20a, 20b, first bearing surfaces 22a, 22b and shoulders 23a, 23b will be understood to collectively define a pair of cylindrical openings having a first internal diameter, and inwardly-projecting annular shoulders defining openings of a second, smaller internal diameter.

Each mating half 20a, 20b defines along the bottom wall thereof a pair of spaced apart openings 24a, 24b, respectively. As depicted, the openings 24a of the mating half 20a are characterized by a greater length than the openings 24b of the opposing mating half 20b, extending along the central surface of the mating half 20a so as to terminate proximate bearing surfaces 22a. In the mated condition of the mating halves 20a, 20b, openings 24a, 24b will be understood to collectively define a pair of slots through which supports 11a, 11b are received, the length of the slots coextensive with the extent of pivotal movement of the core portion relative to the supports 11a, 11b.

Each mating half 20a, 20b will be seen to further include, respectively, complimentary portions of second bearing surfaces 25a, 25b, defined in upstanding walls positioned proximate the first bearing surfaces 22a, 22b. As shown, each of these second bearing surfaces 25a, 25b is semi-cylindrical in shape so as to define, in the mated condition of the mating halves 20a, 20b, a pair of cylindrical openings for receiving pivot pins 44 by which the lock 40 is pivotally supported on the core portion proximate the hub 30.

Figure 5:
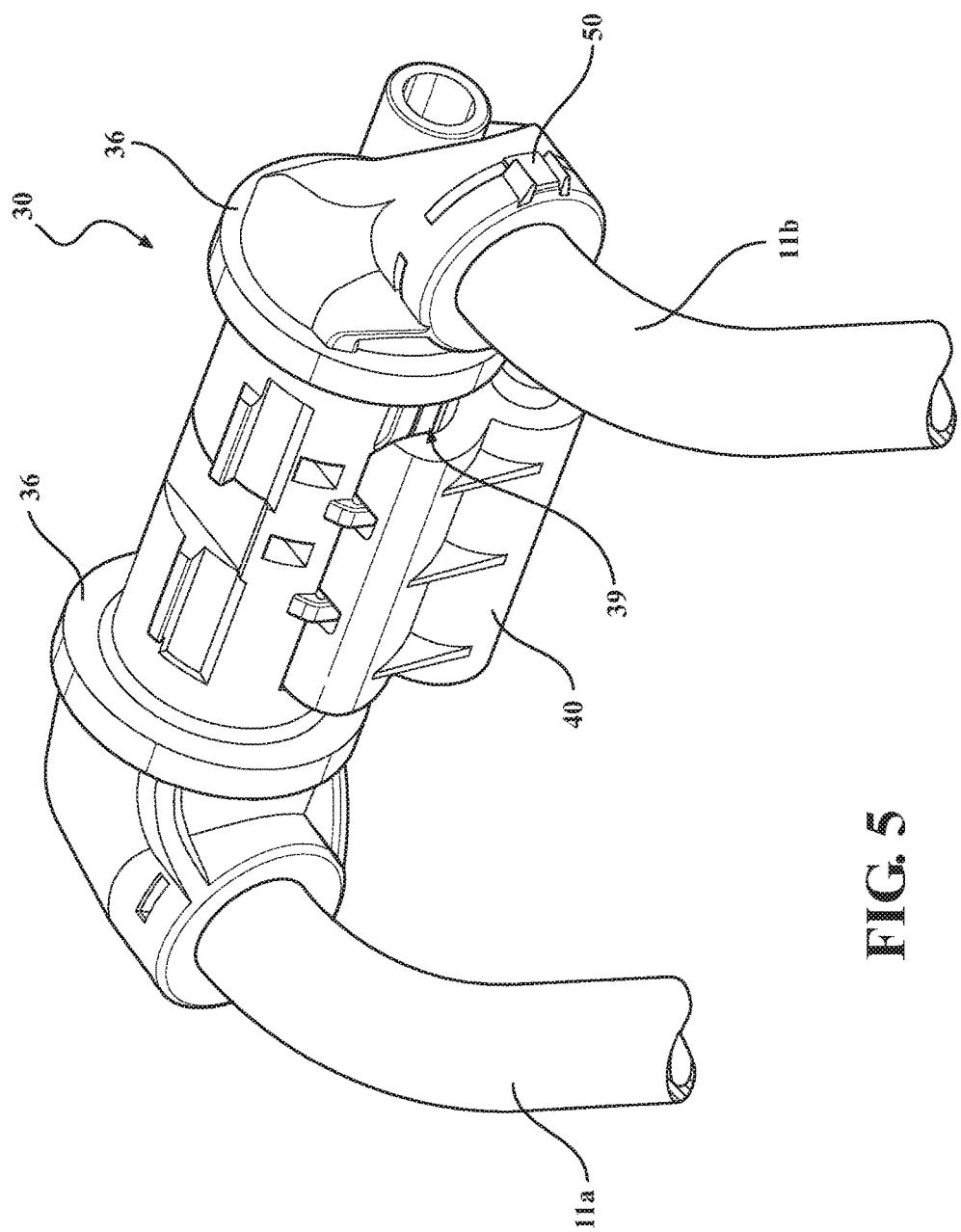
FIG. 5 is a detailed perspective view of the interconnected hub and supports, and further depicting the disposition of the lock relative to the hub.
Figure 6:
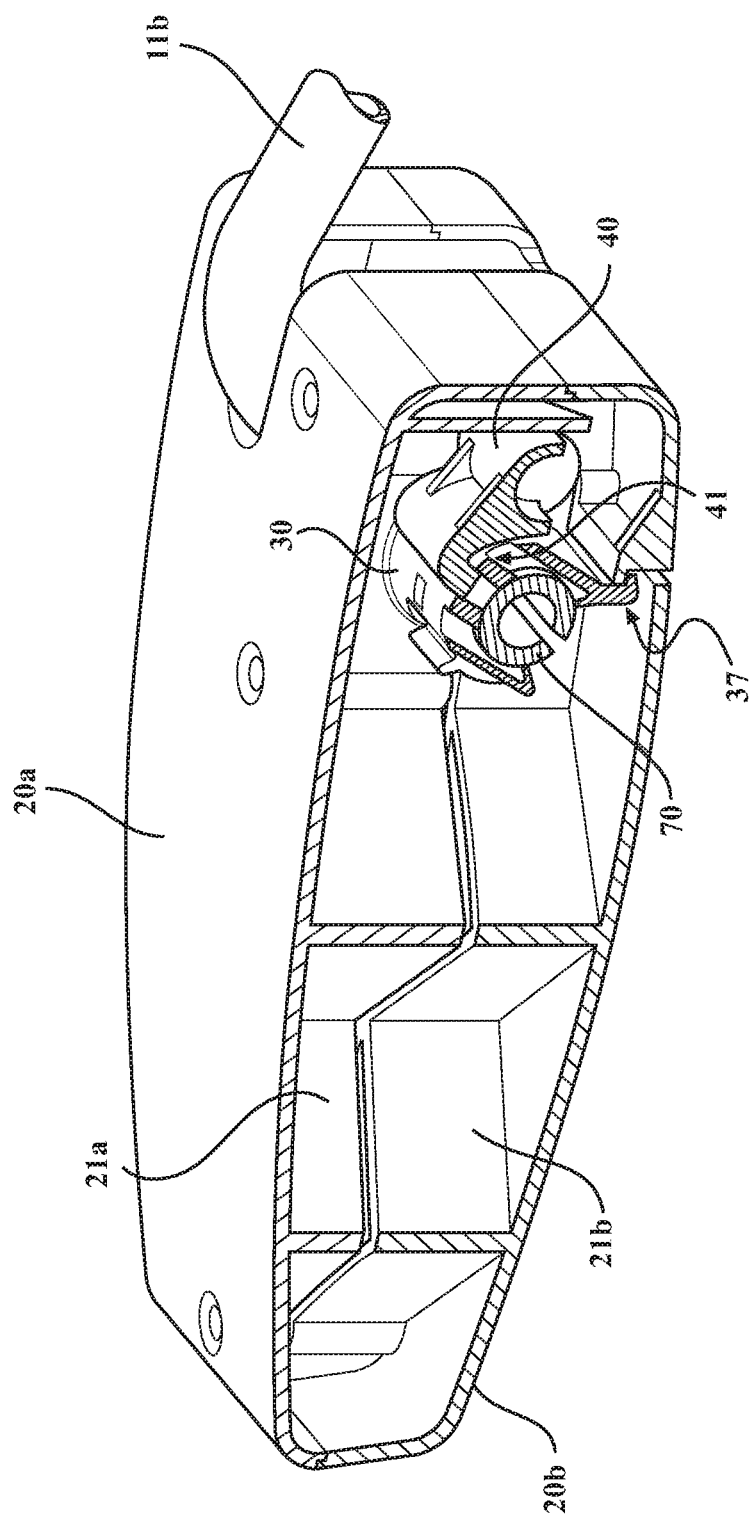
FIG. 6 is a longitudinal cross-sectional view through the assembled head restraint assembly of the exemplary embodiment.

With continuing reference to FIGS. 1 and 5, and also to FIG. 6, mating half 20b includes a secondary lock support 26 positioned between the first and second bearing surfaces. Secondary lock support 26 includes a first portion 27 extending outwardly from the central surface of the mating half 20b, the first portion 27 terminating in a lip or tab 28 extending away from the first portion 27 and oriented generally parallel to the central surface of the mating half 20b.

Mating half 20a includes a lock spring support 29 positioned between the second bearing surfaces 25a and, as shown, proximate the bottom wall of the mating half 20a.

In the illustrated embodiment, each mating half 20a, 20b is monolithic, being fashioned from plastic or metal by molding, for instance. According to this embodiment, it will be understood that the various above-described elements, including the first and second bearing surfaces, are integral with the core portion 20. However, it will be understood that, where the core portion 20 is formed from mating parts, such mating parts may also be unitary in construction (i.e., formed of multiple separate elements which are assembled together).

With reference now being had to FIGS. 1 and 3-8B, hub 30 may be seen to comprise a generally elongate, somewhat cylindrically-shaped element including, at opposite ends thereof, openings 31 oriented generally perpendicular to the longitudinal axis of the hub for receiving the ends 12a, 12b of supports 11a, 11b. Interference ribs 32 disposed within each opening 31 contact the exterior surface of each support 11a, 11b to create an interference fit between the supports 11a, 11b and hub 30. Furthermore, each support 11a, 11b is locked in position within the hub 30 by means of U-brackets 50. Each U-bracket 50 has a pair of spaced-apart arms 51 and, intermediate these arms 51, a perpendicularly-oriented tab 52. Each U-bracket is received in one of a pair of slots 35 extending through the hub 30 and intersecting the openings 31, as shown.

Figure 3:
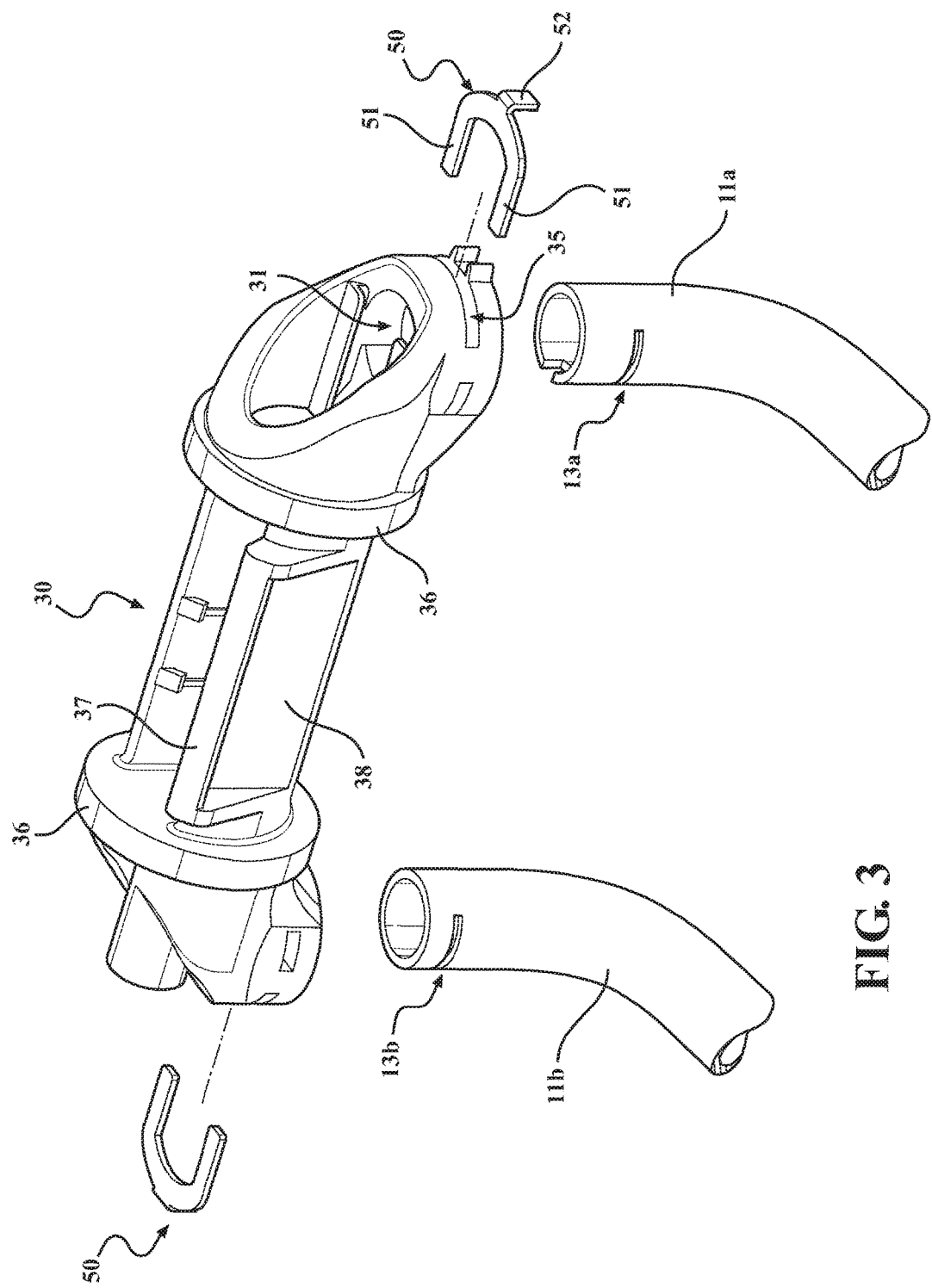
FIG. 3 is an exploded perspective view of the ends of the supports and the hub.
Figure 4:
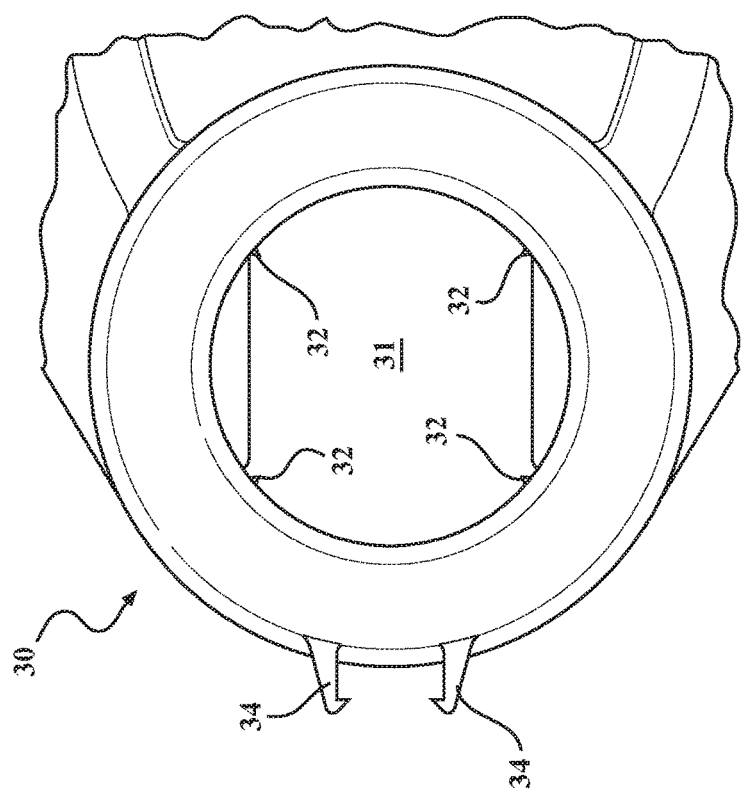
FIG. 4 is a detailed end-view of an opening in the hub for receiving a support.
Figure 3A:
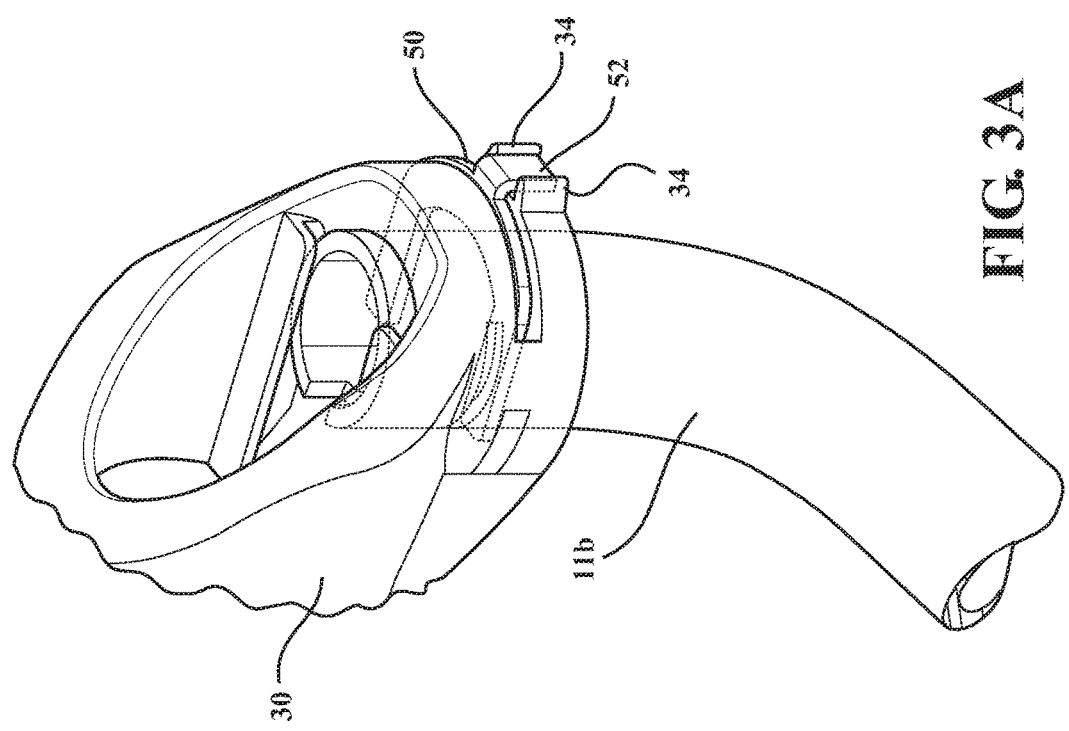
FIG. 3A is detailed view of the hub depicting the manner of attachment of the support ends to the hub.

As best shown in FIGS. 1 and 3, each support end 12a, 12b includes a pair of lock slots 13a, 13b disposed oppositely about the circumference of the support 12, 12b. After the ends 12a, 12b of each support 11a, 11b are received through openings 31 and the lock slots 13a, 13b aligned in the same plane as the slots 35, a U-bracket is inserted into each slot 35 so that the arms 51 are received in a pair of lock slots 13a or 13b and the tab 52 is captured between tabs 34 disposed on the exterior of hub 30 adjacent each slot 31. In this manner, each support 11a, 11b is securely connected to hub 30. As will be appreciated, supports 11a, 11b are at least stationary in forward and rearward directions relative to the seatback with which they are associated (although vertical adjustment of headrest supports relative to the seatback is conventional to permit adjustment in the height of the bun assembly). Consequently, the secure connection between the hub 30 and supports 11a, 11b also renders the hub stationary.

Of course, it will understood that other means may be employed to securely connect hub 30 to supports 11a, 11b, the foregoing means being only exemplary and not limiting of the present invention.

With reference now being had to FIGS. 3, 5, 8A and 8B, a pair of pivot portions 36 are provided on the hub 30, each pivot portion taking the form of an annular rim or flange extending radially from the hub 30. In the assembled head restraint assembly the hub 30 is captured between the mating halves 20a, 20b with the first bearing surfaces 22a, 22b riding on the pivot portions 36 to facilitate pivotal movement of the core portion 20 relative to the hub 30 and supports 11a, 11b.

Intermediate the pivot portions 36 there is a hook portion which, as best shown in FIGS. 3 and 6, is defined by a rib 37 extending longitudinally between the pivot portions 36. The rib 37 is disposed at the end of a recessed area 38 of the hub 30 and is oriented to define, in combination with the recessed area 38, a hook that engages with secondary lock support 26 in the upright position of the core portion (FIG. 6).

Spaced apart from the hook portion there is also provided on the hub 30 between pivot portions 36 a recess 39 for receiving the tooth 41 of lock 40 in the position of engagement, as described further below.

In the illustrated embodiment, hub 30 is monolithic, being fashioned from plastic or metal by molding, for instance. According to this embodiment, it will be understood that the various above-described elements of the hub 30 are integral therewith. However, it will be understood that hub 30 may also be formed of multiple separate elements which are assembled together).

Lock 40 may be biased into the position of engagement of tooth 41 with the recess 39 of hub 30 by a lock spring 42 associated with both lock 40 and lock spring support 29. In the illustrated embodiment, lock spring 42 is a torsion spring secured to the lock 40 and having one end thereof engaging the lock spring support 29 to bias the lock 40 into the position of engagement with the hub 30.

To disengage the tooth 41 from recess 39, one or more adjustment mechanisms are provided. According to one form, the adjustment mechanism includes a cable 80 disposed in a cable housing 81 which extends, at one end, through one of the supports 11a, 11b and into the core portion 20 where the end of cable 80 is connected to the slide member 70 via a 90 degree end-fitting (best shown in FIG. 7). Slide member 70 is disposed within a longitudinal channel 33 of hub 30 and is reciprocally moveable between extended and retracted positions. Slide member 70 has a cam surface 71 (best shown in FIGS. 1 and 7) which acts against a variable pitch surface 42 of the tooth 41 of lock 40 to urge tooth 41 out of engagement with recess 39 when slide member 70 is moved to the extended position thereof. A coil spring 72 is disposed in one end of the channel to bias slide member 70 to the retracted position thereof.

At the opposite end thereof, cable housing 81 terminates proximate a user actuatable release lever (provided, for instance, on or proximate the seat back) operatively connected to the opposite end of cable 80. User actuation of the release lever is operative to pull the cable 80 within the housing 81, thereby pulling slide member 70 further into channel 33 and so into the extended position of the slide member 70, in which position cam surface 71 acts against the variable pitch surface 42 to urge tooth 41 out of engagement with recess 39. When the user releases the release lever, the slide member 70 is biased back to the retracted position, whereupon the lock 40 is urged by the lock spring 42 to pivot towards the hub 30, bringing tooth 41 back into engagement with the recess 39.

Figure 7:
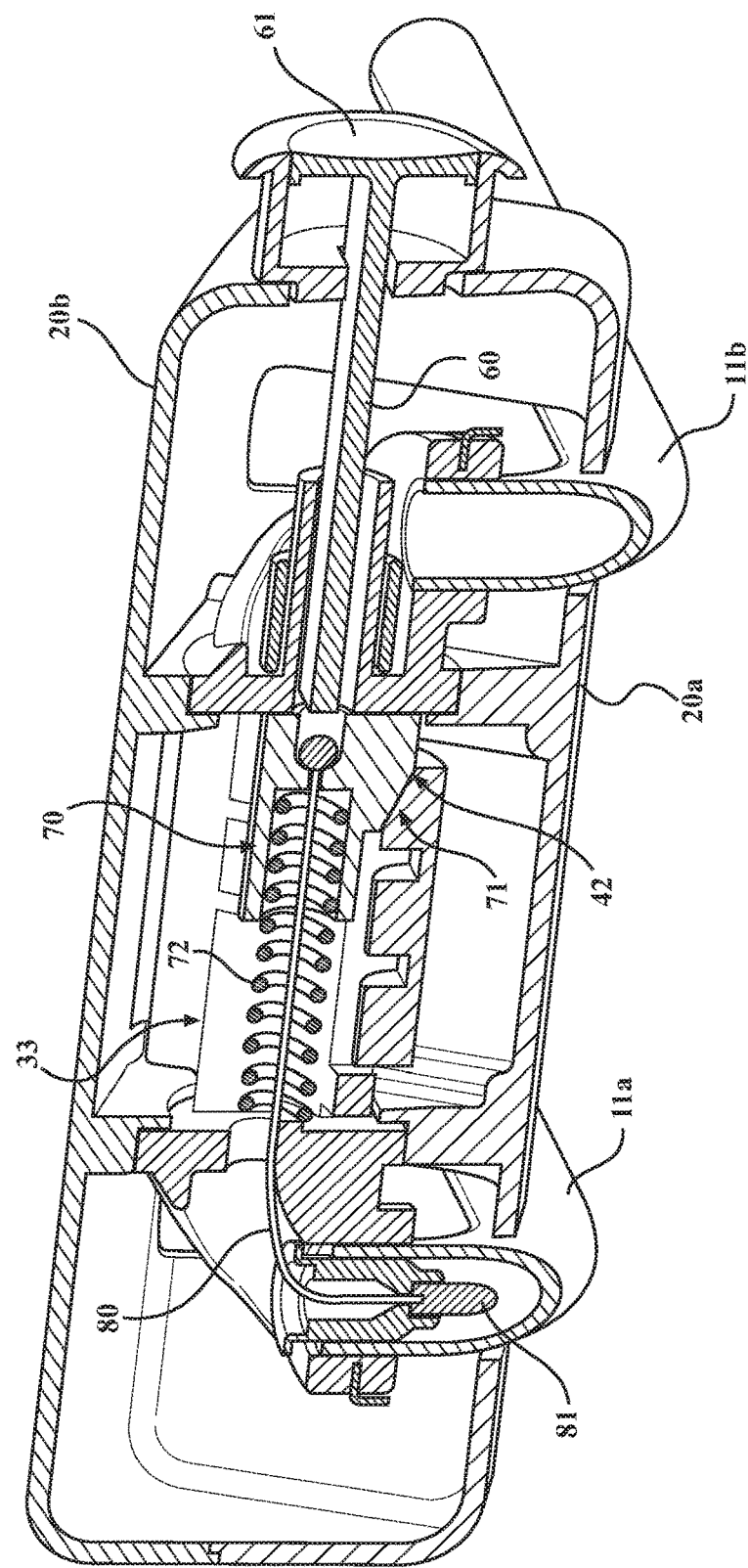
FIG. 7 is a transverse cross-sectional view the assembled head restraint assembly of the exemplary embodiment, taken through the hub.

Alternatively, or in addition, to the foregoing adjustment mechanism, the head restraint assembly may include a manually actuatable, push-button adjustment mechanism disposed in the core portion 20 and accessible to a user (through the bun assembly cover portion) to permit the selective release of the lock 40 from the hub 30. Referring specifically to FIGS. 1, 5 and 7, the push-button mechanism comprises an actuator 60, operable by a user, such as a vehicle occupant, to move the slide member 70 disposed within a longitudinal channel 33 in the hub 30 between a first, retracted position and a second, extended position. Actuator 60 is, as shown, in the form of a rod received through openings in the core portion 20 and the hub 30 and reciprocally, moveably received within the longitudinal channel 33 in the hub 30. A first end of the actuator 60 includes a "button" 61 that is accessible to the user through (such as, for instance, through an opening (not shown) in the bun assembly cover portion (not shown), per convention).

"Button" 61 is, by way of example and without limitation, dimensioned to be pushed by a user's finger.

The spring 72 biasing of the slide member 70 in the cable adjustment mechanism biases the actuator to the retracted position of the slide member 70. Where the cable adjustment mechanism is not used, spring 72 may still be employed to bias the actuator to the retracted position or, alternatively, a similar (e.g., coil) spring may be provided about the shaft of actuator 60 between the hub 30 and the core portion 30.

Slide member 70 is disposed at the end of the actuator 60 opposite the "button" 61. Slide member 70 may be formed as part of the actuator 60 or as a separate component attached thereto. In either case, slide member 70 has a cam surface 71 (best shown in FIGS. 1 and 7) which acts against a variable pitch surface 42 of the tooth 41 of lock 40 to urge tooth 41 out of engagement with recess 39 when slide member 70 is driven to the extended position thereof by a user pushing the "button" 61 of actuator 60. Conversely, when the user releases the "button" 61, the actuator 60 is driven in the opposite direction by the biasing action of the spring, which motion carries the slide member back to the retracted position thereof and so permits the lock tooth 41 to re-engage with the recess 39.

Figure 8A:
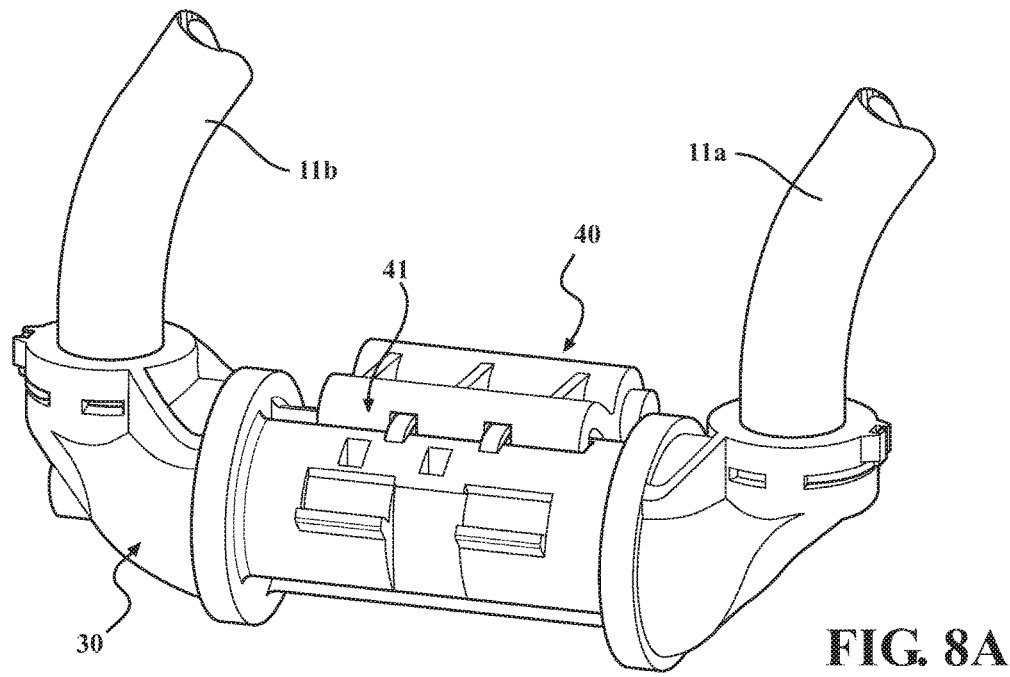
FIGS. 8A and 8B are detailed perspective views of the head restraint assembly of the exemplary embodiment, showing the lock in the positions of engagement (FIG. 8A) and disengagement (FIG. 8B) with respect to the hub.
Figure 8B:
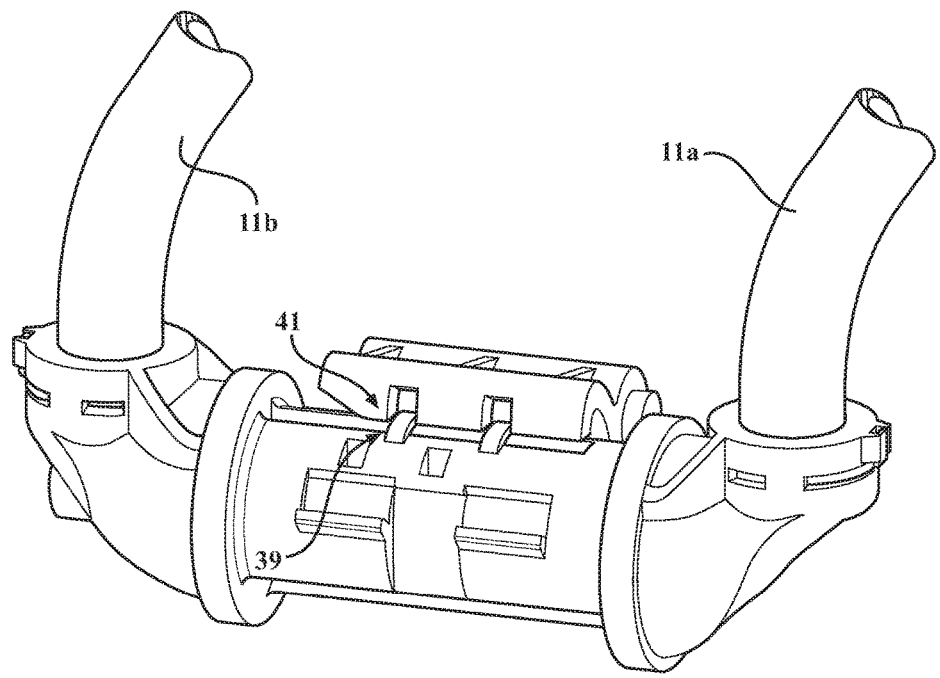

With reference also being had to FIGS. 8A and 8B, the head restraint assembly according to the above-described embodiment works as follows in operation: With the lock 40 in the position of engagement with the hub 30, the core portion (and, therefore, the bun assembly) will be in an upright position relative to the supports 11a, 11b (shown in FIGS. 6 and 9). From this position, the lock 40 may be moved to the position of disengagement by actuation of a release mechanism, such as in the form of the cable mechanism or push-button mechanism described above. With respect to the cable mechanism, the user manually actuates a release lever to effect, via cable 80, movement of slide member 70 in the channel so that the cam surface 71 acts against variable pitch surface 42 of the tooth 41 of lock 40 to urge tooth 41 out of engagement with recess 39 (i.e., the position of disengagement). A spring 90, shown in FIG. 9, biases the core portion 20 relative to the hub 30 to effect automatic pivotal movement of the core portion (and, hence, the bun assembly) to a folded position; that is, a position in which the core portion 20 is orientated approximately 90 degrees from its upright position relative to the seat back. In this position, as is known in the art, the seat back may itself be more easily folded into a stowage position.

Figure 9:
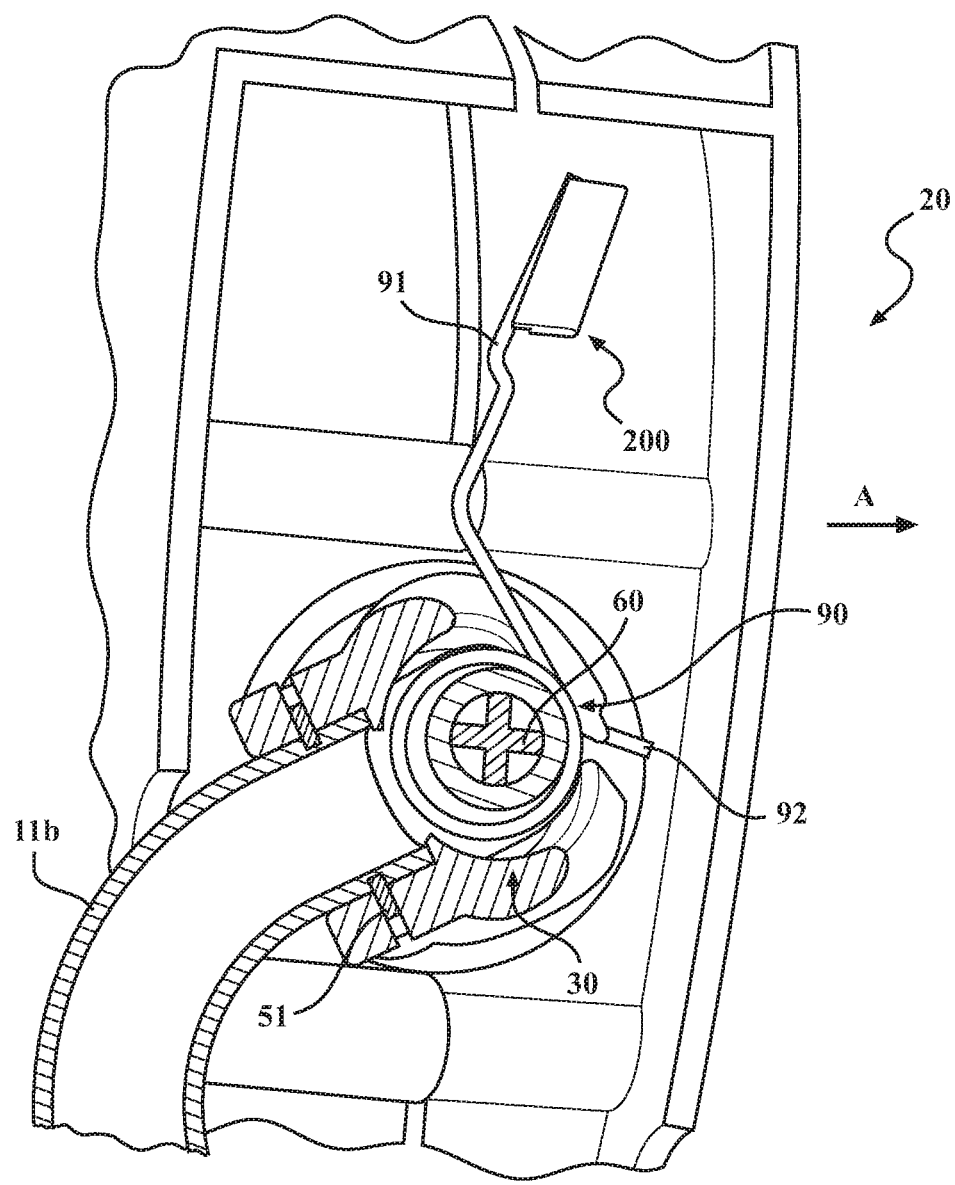
FIG. 9 is a detailed cross-sectional view of the head restraint assembly, showing in particular the arrangement of the spring biasing the core portion for movement relative to the hub during adjustment of the bun assembly.

As shown in FIG. 9, spring 90 is a torsion spring the coiled portion of which is disposed around the cylindrical section of the hub 30 defining the passageway in which the actuator 60 is received (see, e.g., FIGS. 1, 5, 7). The free end 91 of the spring 90 is captured in a pocket 200 formed as part of the core half 20b (see also FIGS. 1 and 2), while the other free end 92 engages with a surface of the hub 30. As will be appreciated, the spring 90 is pre-loaded so as to bias the core portion 20 in the direction of the arrow A shown in FIG. 9.

Movement of the core portion (and, hence, the bun assembly) to the folded position may also be effected by user actuation of the push-button mechanism. With respect to this mechanism, a user's depressing the push-button 61 effects translational movement of the actuator 60 further into the hub 30, carrying with it the slide member 70. As the cam surface 71 of slide member 70 acts against the variable pitch surface 42 of the tooth 41 of lock 40, tooth 41 is urged out of engagement with recess 39 and the spring 90 biases the core portion 20 relative to the hub 30 to effect automatic pivotal movement of the bun assembly to a folded position.

According to either of the foregoing actuation mechanisms, the bun assembly is returned to the upright position thereof by a user's manually urging the bun assembly, against the bias of the spring 90, back to the upright position until the tooth 41 of lock 40 reengages with the recess 39 of hub 30 and the hook overlaps the secondary lock support 26.

The above description is of preferred embodiments. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The invention in which an exclusive property or privilege is claimed is defined as follows:

1. A head restraint assembly for a seat, the head restraint assembly comprising: at least one support for mounting a bun assembly above the seat back; a core portion having integral first bearing surfaces; a stationary hub mounted on the at least one support, the stationary hub disposed at least substantially within the core portion and pivotally supporting the core portion via the integral first bearing surfaces; and a lock pivotally supported within the core portion, the lock selectively pivotally moveable between positions of engagement with, and disengagement from, the stationary hub, wherein the position of engagement is characterized in that the core portion is fixed relative to the stationary hub and at least one support, and the position of disengagement is characterized in that the core portion is pivotally moveable relative to the stationary hub and at least one support.

2. The head restraint assembly of claim 1, wherein each at least one support has a free upper end terminating in a curved end received in a corresponding opening in the hub.

3. The head restraint assembly of claim 2, wherein the at least one support comprises a pair of spaced-apart supports, each support having a free upper end terminating in a curved end received in one or a pair of corresponding openings in the hub which are oriented generally perpendicular to a longitudinal axis of the hub.

4. The head restraint assembly of claim 3, further comprising interference ribs disposed within each of said opening in the hub, each interference rib contacting the exterior surface of each support to create an interference fit between the supports and the hub.

5. The head restraint assembly of claim 3, wherein each support is locked in position within the hub by means of a U-bracket engaging both the hub and the support.

6. The head restraint assembly of claim 1, wherein the core portion is comprised of mating halves.

7. The head restraint assembly of claim 6, wherein each mating half is monolithic.

8. The head restraint assembly of claim 6, wherein the mating halves define, when mated, an internal area for housing the hub and lock.

9. The head restraint assembly of claim 5, wherein interiorly-facing surfaces of each mating half comprise complimentary portions which collectively define the first bearing surfaces.

10. The head restraint assembly of claim 9, wherein each of the complimentary portions are semi-cylindrical in shape and include a semi-circular shape shoulder extending radially inwardly, and wherein further, in the mated condition of the mating halves, the complimentary portions and shoulders collectively define a pair of cylindrical openings having a first internal diameter and inwardly-projecting annular shoulders defining openings of a second, smaller internal diameter.

11. The head restraint assembly of claim 10, wherein a pair of pivot portions are provided on the hub, each pivot portion taking the form of an annular flange extending radially from the hub, and wherein further the hub is captured between the mating halves with the first bearing surfaces riding on the pivot portions to facilitate pivotal movement of the core portion relative to the hub.

12. The head restraint assembly of claim 6, wherein each mating half includes complimentary portions of second bearing surfaces which, in the mated condition of the mating halves, define a pair of cylindrical openings for receiving pivot pins by which the lock is pivotally supported on the core portion proximate the hub.

13. The head restraint assembly of claim 12, wherein one of the mating halves includes a secondary lock support, the secondary lock support engaging with a hook provided on the stationary hub when the lock is in the position of engagement with the stationary hub.

14. The head restraint assembly of claim 1, wherein the lock is biased into the position of engagement with the stationary hub.

15. The head restraint assembly of claim 1, further comprising an adjustment mechanism to selectively pivotally move the lock into the position of disengagement from the stationary hub, the adjustment mechanism including a slide member disposed within the hub, the slide member being reciprocally moveable between extended and retracted positions thereof, and wherein the slide member has a cam surface which, in the extended position of the slide member, acts against the lock to urge the lock into the position of disengagement from the stationary hub.

16. The head restraint assembly of claim 15, wherein the slide member is biased to the retracted position thereof.

17. The head restraint assembly of claim 15, wherein the adjustment mechanism includes a cable connected to the slide member, the slide member being moveable into the extended position thereof by movement of the cable.

18. The head restraint assembly of claim 15, wherein the adjustment mechanism includes a user-operable actuator reciprocally, moveably positioned within the hub, the slide member being moveable into the extended position thereof by movement of the actuator.

19. The head restraint assembly of claim 17, wherein the adjustment mechanism includes a user-operable actuator reciprocally, moveably positioned within the hub, the slide member being moveable into the extended position thereof by movement of the actuator.

20. The head restraint assembly of claim 1, wherein the core portion is biased to automatic pivotal movement relative to the relative to the stationary hub and at least one support when the lock is in the position of disengagement from the stationary hub.

21. A head restraint assembly for a seat, the head restraint assembly comprising: at least one support for mounting a bun assembly above the seat back; a core portion having integral first bearing surfaces; a stationary hub mounted on the at least one support, the stationary hub disposed at least substantially within the core portion and pivotally supporting the core portion via the integral first bearing surfaces; and a lock pivotally supported within the core portion, the lock selectively pivotally moveable between positions of engagement with, and disengagement from, the stationary hub, wherein the position of engagement is characterized in that the core portion is fixed relative to the stationary hub and at least one support, and the position of disengagement is characterized in that the core portion is pivotally moveable relative to the stationary hub and at least one support; and further comprising an adjustment mechanism to selectively pivotally move the lock into the position of disengagement from the stationary hub, the adjustment mechanism including a slide member disposed within the hub, the slide member being reciprocally moveable between extended and retracted positions thereof, and wherein the slide member has a cam surface which, in the extended position of the slide member, acts against the lock to urge the lock into the position of disengagement from the stationary hub.

22. The head restraint assembly of claim 21, wherein the core portion is comprised of mating halves defining, when mated, an internal area for housing the hub and lock.

23. The head restraint assembly of claim 22, wherein interiorly-facing surfaces of each mating half comprise complimentary portions which collectively define the first bearing surfaces, wherein each of the complimentary portions are semi-cylindrical in shape and include a semi-circular shaped shoulder extending radially inwardly, and wherein further, in the mated condition of the mating halves, the complimentary portions and shoulders collectively define a pair of cylindrical openings having a first internal diameter and inwardly-projecting annular shoulders defining openings of a second, smaller internal diameter.

24. The head restraint assembly of claim 23, wherein a pair of pivot portions are provided on the hub, each pivot portion taking the form of an annular flange extending radially from the hub, and wherein further the hub is captured between the mating halves with the first bearing surfaces riding on the pivot portions to facilitate pivotal movement of the core portion relative to the hub.

25. The head restraint assembly of claim 22, wherein each mating half includes complimentary portions of second bearing surfaces which, in the mated condition of the mating halves, define a pair of cylindrical openings for receiving pivot pins by which the lock is pivotally supported on the core portion proximate the hub.

26. The head restraint assembly of claim 25, wherein one of the mating halves includes a secondary lock support, the secondary lock support engaging with a hook provided on the stationary hub when the lock is in the position of engagement with the stationary hub.

27. The head restraint assembly of claim 21, wherein the lock is biased into the position of engagement with the stationary hub.

28. The head restraint assembly of claim 21, wherein the slide member is biased to the retracted position thereof.

29. The head restraint assembly of claim 21, wherein the adjustment mechanism includes a cable connected to the slide member, the slide member being moveable into the extended position thereof by movement of the cable.

30. The head restraint assembly of claim 21, wherein the adjustment mechanism includes a user-operable actuator reciprocally, moveably positioned within the hub, the slide member being moveable into the extended position thereof by movement of the actuator.

31. The head restraint assembly of claim 21, wherein the core portion is biased to automatic pivotal movement relative to the relative to the stationary hub and et least one support when the lock is in the position of disengagement from the stationary hub.

* * * * *